Patented Oct. 24, 1950

2,526,773

UNITED STATES PATENT OFFICE 2,526,773

ETHYLENE INTERPOLYMERS

Raymond Bliss Richards, James R. Myles, and Donald Whittaker, Northwich, England, assignors to Imperial Chemical Industries Limited, a corporation of Great Britain No Drawing. Application September 7, 1945, Serial No. 615,092. In Great Britain July 26, 1944

4 Claims. (Cl. 260—78.5)

This invention relates to the manufacture of interpolymers from ethylene and diesters or ethers of unsaturated alcohols, for example diallyl esters of dibasic acids.

In U. S. Patent 2,200,429 is described a process for making interpolymers of ethylene with other polymerisable organic compounds containing one or more double bonds and capable of forming dimers or higher polymers, which involves subjection to a high pressure and temperature. In U. S. Patent 2,342,400 it has been shown that such a process can also be carried out in aqueous emulsion using oxygen or substances supplying oxygen as polymerisation accelerators. Substances which are known to interpolymerise with ethylene include vinyl compounds, divinyl compounds such as butadiene and divinyl benzene, esters of unsaturated acids, and other polymerisable mono- or polyethenoid compounds. In making ethylene interpolymers with divinyl or other diene compounds, the products hitherto obtained have been hard, insoluble or sparingly soluble solids. Such solids are not always as convenient to use in manufacturing processes as are solids which are fusible or soluble and which can be rendered infusible or insoluble on further treatment.

It is also known that monoethenoid compounds containing the group $CH_2=C<$ form interpolymers with compounds containing the polymerisable group $CH_2=C<$ and in addition at least one other polymerisable olefinic double bond separated therefrom by at least one intervening atom, e. g. with diallyl esters. The monoethenoid compounds known for this purpose are vinyl esters, vinyl ethers and vinyl ketones, acrylic and substituted acrylic acids and esters, and monovinyl aromatic compounds. Such interpolymers can be made by heating or exposing to actinic light, with or without catalysts. These interpolymers have not in general the same high degree of stability and inertness which is characteristic of ethylene polymers, and the conditions required for these interpolymerisations are entirely different from those required for ethylene interpolymerisations.

One object of this invention is to modify ethylene polymers in a manner which raises the softening temperature and the tensile strength, and also permits subsequent hardening, curing or yet further raising of the softening temperature. Another object is to provide new interpolymers of ethylene with diesters and ethers of unsaturated alcohols. Another object is to prepare interpolymers of diesters or ethers of unsaturated alcohols by a high pressure process thus modifying the properties thereof.

According to the present invention, ethylene together with a diester or ether of unsaturated alcohols, preferably a diallyl ester of a saturated dibasic acid, is subjected to an elevated temperature and pressure, preferably in the presence of oxygen or a per-compound as catalyst, and if desired in the presence of an aqueous or organic liquid medium.

The invention includes thioesters and thioethers.

One preferred group of interpolymers is those which contain between 0.1 and 5% by weight of ester or ether. Such interpolymers are obtained when the weight of diester or ether employed is between 0.05 and 3% of the weight of ethylene employed. In this range we obtain high molecular weight solids which are essentially modified polythenes having a higher softening temperature and higher tensile strength than polythenes. These materials can be moulded and formed into films, and on further heating or subjection to the usual rubber curing technique can be made still further resistant to softening at elevated temperatures. Similarly, these materials are soluble in organic solvents and can be rendered insoluble by heating or curing. Interpolymers which contain larger proportions of ester or ether such as 10–50% by weight are generally tough rubbery solids, and in this range especially the properties depend to a substantial extent on the particular ester or ether employed. Those which contain over 50% by weight of ester or ether are virtually infusible insoluble solids. The esters and ethers used in the present invention thus provide a useful and controllable method of raising the softening point and/or tensile strength of ethylene interpolymers.

The conditions used depend upon the ester or ether, the catalyst if any, and the nature of the product which is desired. The temperature required is between 40° C. and 400° C., and the pressure generally exceeds 10 atmospheres and is preferably between 100 and 3000 atmospheres. In the presence of catalytic amounts of oxygen, such as 10–500 parts per million based on the weight of ethylene, the reaction is preferably carried out at temperatures of 150°–300° C. and pressures of 500–2000 atmospheres. With more active catalysts such as a per-compound, for example 0.1–1% of a peroxide or persulphate based on the weight of ethylene, the reaction is preferably carried out at temperatures of 60°–250° C. and pressures exceeding 100 atmospheres; pressures of 500–2000 atmospheres are required for products containing a major molecular proportion of ethylene. If desired, the reaction may be carried out in the presence of an aqueous or organic liquid medium, preferably an inert organic liquid medium such as benzene, chlorobenzene or isooctane. In the presence of such a liquid, and when using a per-compound as catalyst, the preferred method is to dissolve or disperse the catalyst in the liquid medium, add the diester or ether thereto, and then add ethylene under pressure. In the absence of a polymerisation catalyst, the higher regions of pressure and temperature, such as 1200–3000 atmospheres and 250°–400° C., are preferred.

In a batch process, the proportions of ethylene and ester or ether are controlled for any given conditions of temperature, pressure and catalyst, by varying the proportion of ester or ether used for a given volume of reaction space. The proportions are also controlled by raising the pressure to increase the ethylene proportion, or by altering the temperature or the catalyst used. When the proportion of ester or ether is low we prefer to have an organic liquid medium present, as this permits the formation of substantially homogeneous interpolymers. In a continuous process, the reactants may be fed continuously to a pressure vessel, and the interpolymer may be continuously withdrawn and untreated ethylene separated therefrom by lowering the pressure.

The invention is illustrated but not restricted by the following examples in which the parts are by weight.

Example 1

A stainless steel bomb of capacity about 80 parts of water and fitted with a stirrer is charged with 0.5 part by weight of diallyl oxalate and 18 parts of thiophene-free benzene. Ethylene containing 250 parts per million of oxygen is introduced so that the pressure is raised to and maintained at 1400 ats. while the temperature is kept at 200° C. After 6 hours the bomb is cooled and the pressure released, and on opening the bomb 10 parts of solid are obtained. This solid has a softening point of 98.5° C. and a tensile strength of 130 kgm./cm.$^2$. The softening point of this product can be raised to 104.5° C. by heating it for half an hour at 250° C.

For comparison an ethylene polymer made in the absence of diallyl oxalate but otherwise under the same conditions has a softening point of 81° C. and a tensile strength of 90 kgm./cm.$^2$. Its softening point is unaffected by heating for half an hour at 250° C. In this example the softening point is measured as the temperature at which a flat-ended needle of area 1 mm.$^2$ under a load of 1 kilogram penetrates a 3 mm. specimen to a depth of 1 mm., the temperature being raised at a rate of 50° C. an hour.

Example 2

On repeating Example 1, but using only 0.1 part of diallyl oxalate, the product has a tensile strength of 135 kgm./cm.$^2$ and a softening point of 94° C.

Example 3

The stainless steel bomb of Example 1 is charged with 2 parts by weight of diallyl oxalate and 0.1 part of benzoyl peroxide. Ethylene is introduced so that the pressure is raised to and maintained at 1000 atmospheres, while the temperature is kept at 100° C. After 15 hours the bomb is cooled and the pressure is released, and on opening the bomb 8 parts of a rubbery solid of density 0.95 gram per cc. and oxygen content 8% is obtained. This solid is insoluble in tetrahydronaphthalene at 190° C.

Example 4

The stainless steel bomb of Example 1 is charged with 2 parts by weight of diallyl sebacate. 35 parts of ethylene containing 200 parts per million of oxygen are introduced so that the pressure is raised to and maintained at 1400 atmospheres, while the temperature is kept at 180° C. for 15 hours. On opening the bomb 13 parts of solid of density 0.93 gram per cc. and oxygen content 4% is obtained. This solid is insoluble in tetrahydronaphthalene at 190° C., and can be hot-pressed into thin tough films.

Example 5

The stainless steel bomb of Example 1 is charged with 7.5 parts by weight of divinyl ether, and ethylene containing 400 parts per million of oxygen is introduced so that the pressure is raised to and maintained at 2000 atmospheres, while the temperature is kept at 200° C. for 17 hours. On opening the bomb 15 parts of a tough spongy solid of which 75% is soluble in boiling xylene is obtained. Analysis shows that the product contains oxygen equivalent to 42% of divinyl ether.

What we claim is:

1. A modified polymer of ethylene containing as the modifying agent from 0.1% to 50% by weight of diallyl oxalate.
2. A modified polymer of ethylene containing as the modifying agent from 0.1% to 50% by weight of diallyl sebacate.
3. A modified polymer of ethylene containing as the modifying agent from 0.1% to 50% by weight of divinyl ether.
4. A modified polymer of ethylene containing as the modifying agent from 0.1% to 50% by weight of a compound of the group consisting of diallyl oxalate, diallyl sebacate and divinyl ether.

RAYMOND BLISS RICHARDS.
JAMES R. MYLES.
DONALD WHITTAKER.

REFERENCES CITED

The following references are of record in the file of this patent:

UNITED STATES PATENTS

| Number | Name | Date |
| --- | --- | --- |
| 2,200,429 | Perrin et al. | May 14, 1940 |
| 2,202,846 | Garvey et al. | June 4, 1940 |
| 2,259,934 | Huijser et al. | Oct. 21, 1941 |